(12) United States Patent
Lu et al.

(10) Patent No.: US 9,464,763 B2
(45) Date of Patent: Oct. 11, 2016

(54) SAFETY VALVE FOR CRYOGENIC INSULATED GAS CYLINDER

(71) Applicant: DANYANG FEILUN GAS VALVE CO., LTD., Danyang (CN)

(72) Inventors: Weiguo Lu, Danyang (CN); Kailu Wang, Danyang (CN)

(73) Assignee: DANYANG FEILUN GAS VALVE CO., LTD., Danyang (CN)

( * ) Notice: Subject to any disclaimer, the term of this patent is extended or adjusted under 35 U.S.C. 154(b) by 41 days.

(21) Appl. No.: 14/396,059

(22) PCT Filed: May 15, 2013

(86) PCT No.: PCT/CN2013/075643
§ 371 (c)(1),
(2) Date: Oct. 22, 2014

(87) PCT Pub. No.: WO2013/170749
PCT Pub. Date: Nov. 21, 2013

(65) Prior Publication Data
US 2015/0107702 A1    Apr. 23, 2015

(30) Foreign Application Priority Data

May 16, 2012  (CN) ..................... 2012 2 0218501 U

(51) Int. Cl.
F17C 13/04   (2006.01)
F16K 15/06   (2006.01)
F16K 17/04   (2006.01)
F16K 15/02   (2006.01)

(52) U.S. Cl.
CPC ............ *F17C 13/04* (2013.01); *F16K 15/026* (2013.01); *F16K 15/063* (2013.01); *F16K 17/04* (2013.01); *F16K 17/0413* (2013.01); *F17C 2205/0332* (2013.01); *F17C 2221/033* (2013.01); *F17C 2223/0161* (2013.01); *F17C 2270/0168* (2013.01); *Y10T 137/7929* (2015.04)

(58) Field of Classification Search
CPC .... F16K 17/04; F16K 15/026; F16K 15/044; F16K 15/048; Y10T 137/7929; Y10T 137/7927; Y10T 137/7928; F17C 2223/0161; F17C 2221/033; F17C 2205/0329
See application file for complete search history.

(56) References Cited

U.S. PATENT DOCUMENTS

| | | | | |
|---|---|---|---|---|
| 5,980,224 A | * | 11/1999 | Regueiro | F02M 69/462 137/539.5 |
| 2010/0043891 A1 | * | 2/2010 | Wilke | F16J 15/3236 137/484.2 |
| 2010/0051118 A1 | * | 3/2010 | Nelson | F16K 15/044 137/539 |
| 2012/0138839 A1 | * | 6/2012 | Fangmeier | G05D 7/016 251/356 |

FOREIGN PATENT DOCUMENTS

| | | |
|---|---|---|
| CN | 2547908 Y | 4/2003 |
| CN | 201672113 U | 12/2010 |
| CN | 202580173 U | 12/2012 |
| JP | 2008196520 A | 8/2008 |

OTHER PUBLICATIONS

Zhou, Zhen et al. Practical Manual for Safty Relief Device of Pressure Piping of Boilber Pressure Vessel, Safety Valve. China Standard Press. Jul. 2003, First edition, p. 68, ISBN7-5066.3096-8.

* cited by examiner

*Primary Examiner* — Mary McManmon
*Assistant Examiner* — Patrick Williams
(74) *Attorney, Agent, or Firm* — Gokalp Bayramoglu

(57) ABSTRACT

The invention relates to a safety valve for a cryogenic insulated gas cylinder, which comprises a valve body, and the valve body further comprises a gas inlet flow channel, a valve seat, a slide way, a valve core and a spring, a gas inlet connecting thread and an adjusting nut. An adjusting nut exhaust hole set on said adjusting nut, a spring set between the said adjusting nut and a spring bracket with an exhaust hole. A valve assembly further comprises the valve core, a plurality of guide rings, a positioning steel ball and a valve flap, a valve core exhaust hole is provided in the valve core. The safety valve has high stability in discharge pressure and return pressure, high repeatability and good sealing performance, and is firm in structure, difficult to be damaged and high in safety.

6 Claims, 1 Drawing Sheet

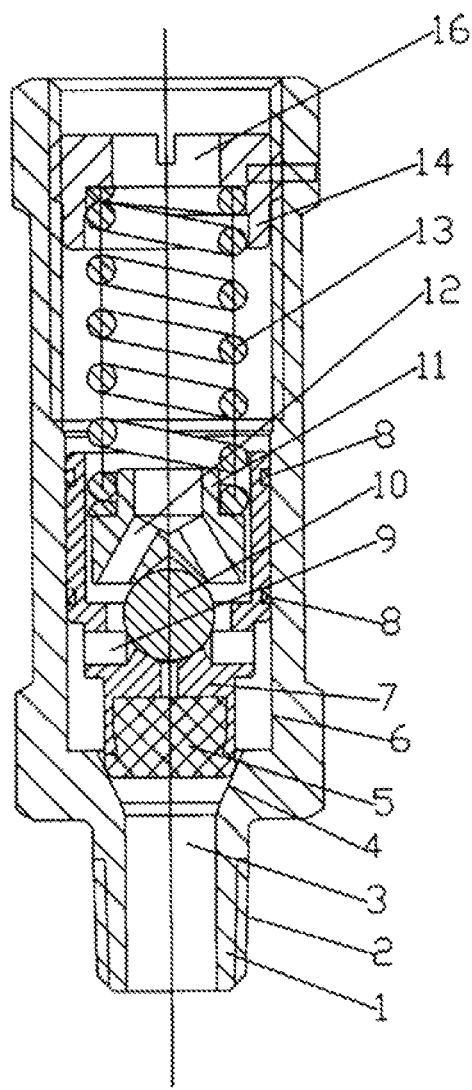

SAFETY VALVE FOR CRYOGENIC INSULATED GAS CYLINDER

FIELD OF THE INVENTION

The present invention relates to the technical field of valve structures, and more particularly, to a safety valve for a low-temperature thermal insulation gas cylinder.

DESCRIPTION OF RELATED ART

Nowadays, with the continuous progress of the industry. Natural Gas Vehicles (NGV vehicles) have been developed. NGV vehicles run on natural gas which is stored in gas cylinders disposed on the body of the vehicles. However, the gas cylinders have limited capacities, which cannot meet the requirements for long distance driving. In contrast, a low-temperature automotive LNG (liquefied natural gas) welded insulated cylinder has the advantageous features of large capacity, long duration and fast liquid refill, but this cylinder must be equipped with a safety valve since a pressure inside an inner chamber thereof will rise due to the intrinsic daily evaporation rate and the vibration generated while vehicles are miming. The current safety valve has the defect that an opening pressure of the safety valve will change after a couple of opening actions. If the opening pressure of the safety valve is too high, pipes of the low-temperature automotive LNG welded insulated cylinder will burst, which may lead to a significant gas leakage and a serious risk of an accident; and if the opening pressure of the safety valve is too low, an energy loss may be caused.

To solve the problems above, research in this field has focused on a safety valve which has high stability and repeatability in terms of a discharge pressure (opening pressure) and a return pressure (closing pressure), and also has a secure structure, is not easy to be damaged, and has high safety.

SUMMARY OF THE INVENTION

Technical Problem

To overcome the deficiencies of the prior arts, an object of the present invention is to provide a safety valve for a low-temperature thermal insulation gas cylinder. The safety valve is particularly applicable to heat transfer and pressure relief applications in an automotive LNG welded insulated cylinder, a welded insulated cylinder and a cryogenic piping system, to ensure the safe operation of the pressure vessels and the pressure piping system.

Technical Solution

According to the technical solution of the present invention, a safety valve for a low-temperature thermal insulation gas cylinder is provided. The safety valve includes a valve body. The valve body includes a gas inlet flow channel, a valve seat, a slide way, a valve core and a spring, which are arranged in the valve body. A gas inlet connecting thread is provided on an outer wall of a gas inlet end of the valve body. An adjusting nut is provided at a gas outlet end of the valve body, and the adjusting nut is provided with an adjusting nut exhaust hole. The spring is disposed between the adjusting nut and a spring bracket with an exhaust hole. A valve assembly is provided in an inner cavity of the valve body below the spring bracket, and the valve assembly is formed by the valve core, guide rings arranged on an outer wall of the valve core, a positioning steel ball and a valve flap, a valve core exhaust hole is provided in the valve core, the spring bracket with the exhaust hole is disposed on the positioning steel ball, and the valve flap is positioned on and in tight fit with the valve seat.

According to a preferred embodiment of the present invention, the valve flap is an arc-shaped valve flap, and the arc-shaped valve flap is in tight fit with the valve seat.

According to a preferred embodiment of the present invention, the guide rings are polytetrafluoroethene guide rings, and two polytetrafluoroethene guide rings are disposed on the outer wall of the valve core and are spaced from each other.

According to a preferred embodiment of the present invention, the spring, the spring bracket, the positioning steel ball, the valve core and the valve flap are arranged with their centers on a common center line.

Advantageous Effect

The present invention has the following advantageous effects.

The present invention is applicable to a low-temperature automotive LNG welded insulated cylinder and a welded insulated cylinder to ensure the safe operation of the low-temperature automotive LNG welded insulated cylinder and the welded insulated cylinder and effectively reduce the possibility of a serious accident.

The safety valve of the present invention has good stability, repeatability and sealing in terms of a discharge pressure (opening pressure) and a return pressure (closing pressure), provides a pressure protection function, and improves the safety of the automotive LNG welded insulated cylinder and the welded insulated cylinder. Further, the safety valve has a secure structure, is not easy to be damaged, and has a high safety.

To ensure the reliability of actions and sealing performance of the safety valve, the safety valve is provided with a guiding mechanism for the moving components, that is, the safety valve additionally has two polytetrafluoroethene guide rings on the outer surface of the valve core, which reduces the friction between the valve core and the slide way and avoids thermal expansion and contraction caused by temperature change.

To ensure the stability and repeatability of actions of the safety valve, the safety valve is provided with a central positioning mechanism for the moving components, that is, the safety valve has a spring bracket and a positioning steel ball which are disposed in the valve core, and the spring, the spring bracket, the positioning steel ball, the valve core and the valve flap are arranged with their centers on a common center line. Thus, the central positioning effect for the valve flap and the valve seat is provided, and the sectional area of the valve flap remains unchanged when the valve flap is raised over the valve seat.

Accordingly, the present invention can solve the problems of the safety valve in the prior arts, by arranging a guiding mechanism for the moving components to ensure the reliability of actions and sealing performance of the safety valve and by arranging a central positioning mechanism for the moving components to ensure the stability and repeatability of actions of the safety valve, which provides a protection effect against an excessive pressure, thereby avoiding potential serious accidents and solving the problem of energy waste. The improvement of the guiding mechanism and the design of the central positioning mechanism impart the safety valve with a reasonable structure and a high safety.

BRIEF DESCRIPTION OF THE DRAWINGS

FIG. 1 is a schematic structural view of an embodiment of the present invention.

DETAILED DESCRIPTION OF THE INVENTION

Hereinafter, the present invention will be illustrated in details in combination with an embodiment. It should be understood that this embodiment is used for illustration purposes only and will not limit the scope of the present invention. In addition, various modifications and alternations can be made on the present invention by those skilled in the art with reference to the teachings of the present invention, and these equivalent modifications and alternations still fall within the scope of the claims of the present invention.

Referring to FIG. 1, a safety valve for a low-temperature thermal insulation gas cylinder according to an embodiment of the present invention is shown. As shown in FIG. 1, the safety valve includes a valve body 1. The valve body 1 includes a gas inlet flow channel 3, a valve seat 4, a slide way 6, a valve core 7 and a spring 13, which are arranged in the valve body 1. A gas inlet connecting thread 2 is provided on an outer wall of a gas inlet end of the valve body 1. An adjusting nut 14 is provided at a gas outlet end of the valve body 1, and the adjusting nut 14 is provided with an adjusting nut exhaust hole 16. The spring 13 is disposed between the adjusting nut 14 and a spring bracket 11 with an exhaust hole 12. A valve assembly is provided in an inner cavity of the valve body below the spring bracket 11, and the valve assembly is formed by the valve core 7, polytetrafluoroethene guide rings 8 arranged on an outer wall of the valve core 7, a positioning steel ball 10 and a valve flap 5, in which two polytetrafluoroethene guide rings 8 are arranged on the outer wall of the valve core 7 and are spaced from each other. A valve core exhaust hole 9 is provided in the valve core 7, the spring bracket 11 with the exhaust hole 12 is disposed on the positioning steel ball 10, and the valve flap 5 is positioned on and in tight fit with the valve seat 4. The valve flap 5 of the present invention is an arc-shaped valve flap, and the arc-shaped valve flap is in tight fit with the valve seat 4.

The spring 13, the spring bracket 11, the positioning steel ball 10, the valve core 7 and the valve flap 5 of the present invention are arranged with their centers on a common center line.

In practice of the present invention, natural gas enters into the valve body 1 from the gas inlet flow channel 3 through a piping system. When a pressure inside an inner chamber of the low-temperature automotive LNG welded insulated cylinder reaches an opening pressure (discharge pressure) of the safety valve, the valve flap 5 is pushed upwards under a pressure of the natural gas away from the valve seat 4. Once reaching a full-open position, the valve flap 5 pushes the valve core 7, the valve core 7 pushes the positioning steel ball 10 and the spring bracket 11 at the same center position, and the spring bracket 11 compresses the spring 13. The polytetrafluoroethene guide rings 8 can reduce the friction between the valve core 7 and the slide way 6. As such, the natural gas enters the valve body 1 through the gas inlet flow channel 3, the valve core exhaust hole 9 and the exhaust hole 12 of the spring bracket 11, and finally is exhausted via the adjusting nut exhaust hole 16, thus reducing the pressure inside the inner chamber of the low-temperature automotive LNG welded insulated cylinder. When the pressure inside the inner chamber drops to a closing pressure (return pressure) of the safety valve, the spring 13 pushes the spring bracket 11, the positioning steel ball 10 and the valve core 7 at the same center position to allow the valve flap 5 to return to the valve seat 4, and thus the safety valve is in a closed position to prevent the gas inside the inner chamber from being not exhausted.

It should be understood that the above embodiment of the present invention is described for illustration purpose only and will not limit the scope of the present invention, and various modifications and alternations can be made on the present invention by those skilled in the art with reference to the specification and drawings of the present invention, and these equivalent modifications and alternations or any direct or indirect applications of the present invention in other relevant technical fields still fall within the scope of the claims of the present invention.

What is claimed is:

1. A safety valve for a cryogenic insulated gas cylinder, comprising: a valve body, wherein the valve body comprises a gas inlet flow channel, a valve seat, a slide way, a valve core and a spring, which are arranged in the valve body; a gas inlet connecting thread is provided on an outer wall of a gas inlet end of the valve body, an adjusting nut is provided at a gas outlet end of the valve body, and the adjusting nut is provided with an adjusting nut exhaust hole; the spring is disposed between the adjusting nut and a spring bracket with an exhaust hole; a valve assembly is provided in an inner cavity of the valve body below the spring bracket, the valve assembly is formed by the valve core, guide rings arranged on the outer wall of the valve core, a positioning steel ball and a valve flap, a valve core exhaust hole is provided in the valve core, the spring bracket with the exhaust hole is disposed on the positioning steel ball, and the valve flap is positioned on and in tight fit with the valve seat wherein the valve flap and the positioning steel ball are separate.

2. The safety valve for a cryogenic insulated gas cylinder according to claim 1, wherein the valve flap is an arc-shaped valve flap, and the arc-shaped valve flap is in tight fit with the valve seat.

3. The safety valve for a cryogenic insulated gas cylinder according to claim 2, wherein the guide rings are polytetrafluoroethene guide rings, and two of the polytetrafluoroethene guide rings are disposed on the outer wall of the valve core and are spaced from each other.

4. The safety valve for a cryogenic insulated gas cylinder according to claim 1, wherein the spring, the spring bracket, the positioning steel ball, the valve core and the valve flap are arranged with their centers on a common center line.

5. The safety valve for a cryogenic insulated gas cylinder according to claim 2, wherein the spring, the spring bracket, the positioning steel ball, the valve core and the valve flap are arranged in sequence with their centers on a common center line.

6. The safety valve for a cryogenic insulated gas cylinder according to claim 3, wherein the spring, the spring bracket, the positioning steel ball, the valve core and the valve flap are arranged in sequence with their centers on a common center line.

* * * * *